(12) United States Patent
Serrano

(10) Patent No.: US 8,756,582 B2
(45) Date of Patent: Jun. 17, 2014

(54) TRACKING A PROGRAMS CALLING CONTEXT USING A HYBRID CODE SIGNATURE

(75) Inventor: Mauricio J. Serrano, Bronx, NY (US)

(73) Assignee: International Business Machines Corporation, Armonk, NY (US)

(*) Notice: Subject to any disclaimer, the term of this patent is extended or adjusted under 35 U.S.C. 154(b) by 312 days.

(21) Appl. No.: 13/214,352

(22) Filed: Aug. 22, 2011

(65) Prior Publication Data

US 2013/0054942 A1 Feb. 28, 2013

(51) Int. Cl.
*G06F 9/44* (2006.01)
*G06F 9/45* (2006.01)

(52) U.S. Cl.
USPC .......................... 717/128; 717/130; 717/131

(58) Field of Classification Search
None
See application file for complete search history.

(56) References Cited

U.S. PATENT DOCUMENTS

| | | | |
|---|---|---|---|
| 4,761,785 A | 8/1988 | Clark et al. | |
| 5,999,730 A | 12/1999 | Lewis | |
| 6,292,569 B1 | 9/2001 | Shear et al. | |
| 7,539,867 B2 | 5/2009 | Bolosky et al. | |
| 2004/0111708 A1* | 6/2004 | Calder et al. | 717/131 |
| 2004/0158818 A1* | 8/2004 | Smith et al. | 717/127 |
| 2009/0007076 A1 | 1/2009 | Al-Omari et al. | |
| 2010/0268995 A1 | 10/2010 | Goodman et al. | |
| 2010/0299499 A1 | 11/2010 | Golla et al. | |

OTHER PUBLICATIONS

James Tuck, Wonsun Ahn, Luis Ceze, and Josep Torrellas. 2008. SoftSig: software-exposed hardware signatures for code analysis and optimization. SIGARCH Comput. Archit. News 36, 1 (Mar. 2008), 145-156. DOI=10.1145/1353534.1346300.*
Mauricio J. Serrano. 2013. Trace construction using enhanced performance monitoring. In Proceedings of the ACM International Conference on Computing Frontiers (CF '13). ACM, New York, NY, USA, Article 34 , 10 pages. DOI=10.1145/2482767.2482811.*
Xiaotong Zhuang, Mauricio J. Serrano, Harold W. Cain, and Jong-Deok Choi. 2006. Accurate, efficient, and adaptive calling context profiling. SIGPLAN Not. 41, 6 (Jun. 2006), 263-271.*
Kim et al., "COBRA: A Framework for Continuous Profiling and Binary Re-Adaption," Technical Report 08-016, Department of Computer Science and Engineering University of Minnesota, May 9, 2008, pp. 1-125.
International Search Report; International Application No. PCT/US 12/44120; International Filing Date: Jun. 26, 2012; Date of mailing: Sep. 19, 2012; 1-7 pages.
International Search Report—Written Opinion—International Application No. PCT/US 12/44120; International Filing Date: Jun. 26, 2012; Date of mailing: Sep. 19, 2012; 1-4 pages.

(Continued)

*Primary Examiner* — James D Rutten
(74) *Attorney, Agent, or Firm* — Cantor Colburn LLP; Preston Young

(57) ABSTRACT

A method for a hybrid code signature including executing, via a processor, an application, the executing comprising executing a root instruction of the application; profiling, via the processor, the executing of the application, the profiling comprising storing a reference signature; determining, via the processor, a working signature of instructions executed subsequent to the executing of the root instruction, the determining comprising implementing a hashing function of the instructions in response to storing the reference signature; tracking the updating of the working signature by storing a value in a counter; and updating continuously, via the processor, the working signature with the hashing function while at least the working signature does not match the reference signature.

25 Claims, 4 Drawing Sheets

(56) References Cited

OTHER PUBLICATIONS

V. Bala et al, "Dynamo: A Transparent Dynamic Optimization System," In Proceedings of Programming Language Design and Implementation (PLDI), 2000, pp. 1-12.

M. Bond and K. McKinley, "Probabilistic Calling Context," In Proceedings of Object Oriented Programming Systems Languages and Applications (OOPSLA) 2007, pp. 1-15.

J. Lu et al., "Design and Implementation of a Lightweight Dynamic Optimization System," Journal of Instruction Level Parallelism, Apr. 2004, pp. 1-24.

M. Merten et al, "A Hardware-Driven Profiling Scheme for Identifying Program Hot Spots to Support Runtime Optimization," Proceedings of the 26th Annual International Symposium of Computer Architecture (ISCA), May 1999, pp. 136-147.

Odaira et al. "Efficient Runtime Tracking of Allocation Sites in Java," in Proceedings of Virtual Execution Environments (VEE), Mar. 2010, ACM, pp. 109-120.

\* cited by examiner

TRACKING A PROGRAMS CALLING CONTEXT USING A HYBRID CODE SIGNATURE

BACKGROUND

The present invention relates generally to data processing, and more specifically to tracking a program's calling context using a hybrid code signature.

Optimizing compilers and runtime code optimizers can gain significant performance benefits by performing code transformations based on a program's runtime profile. One very useful runtime profile is capturing the program's control flow history, which is the order in which individual instructions or function calls of a program were executed. This knowledge of the control flow history can drive powerful program optimizations such as, for example, function in-lining, code cloning, superblock formation, and prefetch insertion.

A program's control flow history can be concisely represented by a list of the branch instructions that were taken in its execution. Branch instructions are points in a program where a choice is made as to which of two or more paths should be followed. Knowing the outcome of each branch instruction is enough information for a code optimizer to know the precise sequence of instructions that were followed in the code's runtime execution.

Software techniques may be used to gather the list of taken branches. However such techniques require expensive program instrumentation and, as such, may exhibit large overheads. Although these software techniques are adequate for static performance analysis, they may not be sufficient for dynamic runtime environments where overheads need to be kept at a small cost. To reduce the overhead of collecting the data, microprocessors may employ hardware techniques to gather this information. However, the additional the area overhead of storing additional branch instructions (e.g., 64-bit branch instructions) and target addresses may limit the amount of hardware dedicated for recording branches.

SUMMARY

An embodiment is a method that includes a method for generating a hybrid code signature. The method includes executing, via a processor, an application, the executing comprising executing a root instruction of the application; profiling, via the processor, the executing of the application, the profiling comprising storing a reference signature determined from the root instruction; determining, via the processor, a working signature of instructions executed subsequent to the executing of the root instruction, the determining comprising implementing a hashing function of the instructions in response to storing the reference signature; tracking the updating of the working signature by storing a value in a counter; and updating continuously, via the processor, the working signature with the hashing function while the working signature at least does not match the reference signature.

Another embodiment is a system having a processor configured to perform a method. The method includes executing an application, the executing comprising executing a root instruction of the application; profiling the executing of the application, the profiling comprising storing a reference signature; determining a working signature of instructions executed subsequent to the executing of the root instruction, the determining comprising implementing a hashing function of the instructions in response to storing the reference signature; tracking the updating of the working signature by storing a value in a counter; and updating continuously the working signature with the hashing function while the working signature at least does not match the reference signature.

A further embodiment is a computer program product having a tangible storage medium readable by a processing circuit and storing instructions for execution by the processing circuit for performing a method. The method includes executing an application, the executing comprising executing a root instruction of the application; profiling the executing of the application, the profiling comprising storing a reference signature; determining a working signature of instructions executed subsequent to the executing of the root instruction, the determining comprising implementing a hashing function of the instructions in response to storing the reference signature; tracking the updating of the working signature by storing a value in a counter; and updating continuously the working signature with the hashing function while the working signature at least does not match the reference signature.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter that is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Exemplary embodiments provide for a hybrid method for enhancing hardware tracing utilizing a program's calling context information by computing a hardware calling context signature using a special purpose register. Knowing the calling context (i.e., the chain of method calls currently active on the stack) is important for understanding the dynamic behavior of large programs. In accordance with an embodiment, calling context information is represented in a hardware signature. Embodiments relate to a hybrid scheme for a probabilistic method of tracking calling context information (or code signature) by using a combination of a function call depth and the program address. Function call depth is captured through a counter, which is incremented and decremented for function calls, while the program address is captured through a hashing function of the return addresses. An exemplary embodiment includes utilizing the call depth in the signature together with the hashing function to improve upon the probabilistic method of tracking calling context. In other embodiments, the hybrid scheme is implemented for loops utilizing a hashing of the branch address close to the loop and implementing a loop counter for tracking the start and end of the loop, that is tracking the branch instruction and resuming after the branch instruction.

Figure 1:
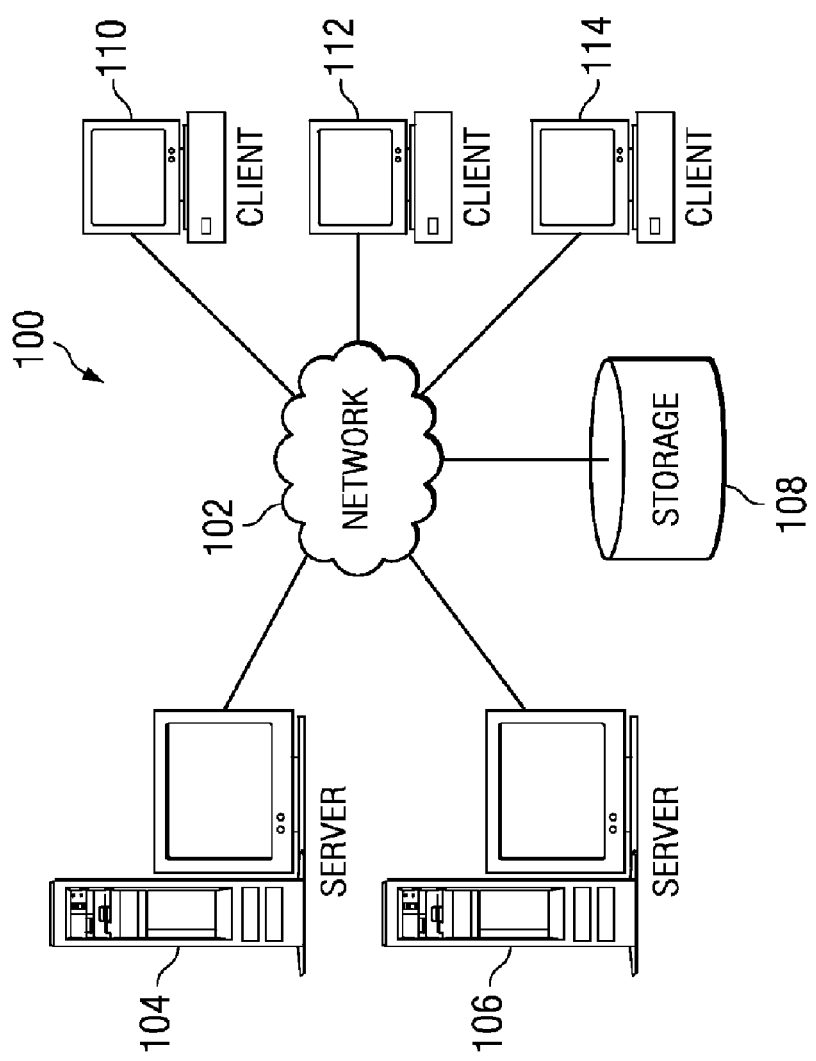
FIG. 1 depicts an example of a block diagram of a system in accordance with exemplary embodiments.

Turning now to the drawings, shown in FIG. 1 is a block diagram of a computer system 100 for implementing the hybrid code signature in exemplary embodiments. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables. FIG. 1 is intended as an example, and not as an architectural limitation for different embodiments.

In the example shown, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices (not shown).

In one exemplary embodiment, network data processing system 100 is the Internet with network 102 representing a worldwide collection of networks and gateways that use the Transmission Control Protocol/Internet Protocol (TCP/IP) suite of protocols to communicate with one another. In other embodiments, network data processing system 100 may be implemented as a number of different types of networks, such as for example, an intranet, a local area network (LAN), or a wide area network (WAN). The hardware calling context signature may be implemented in the server 104-106 or the client 110-114.

Figure 2:
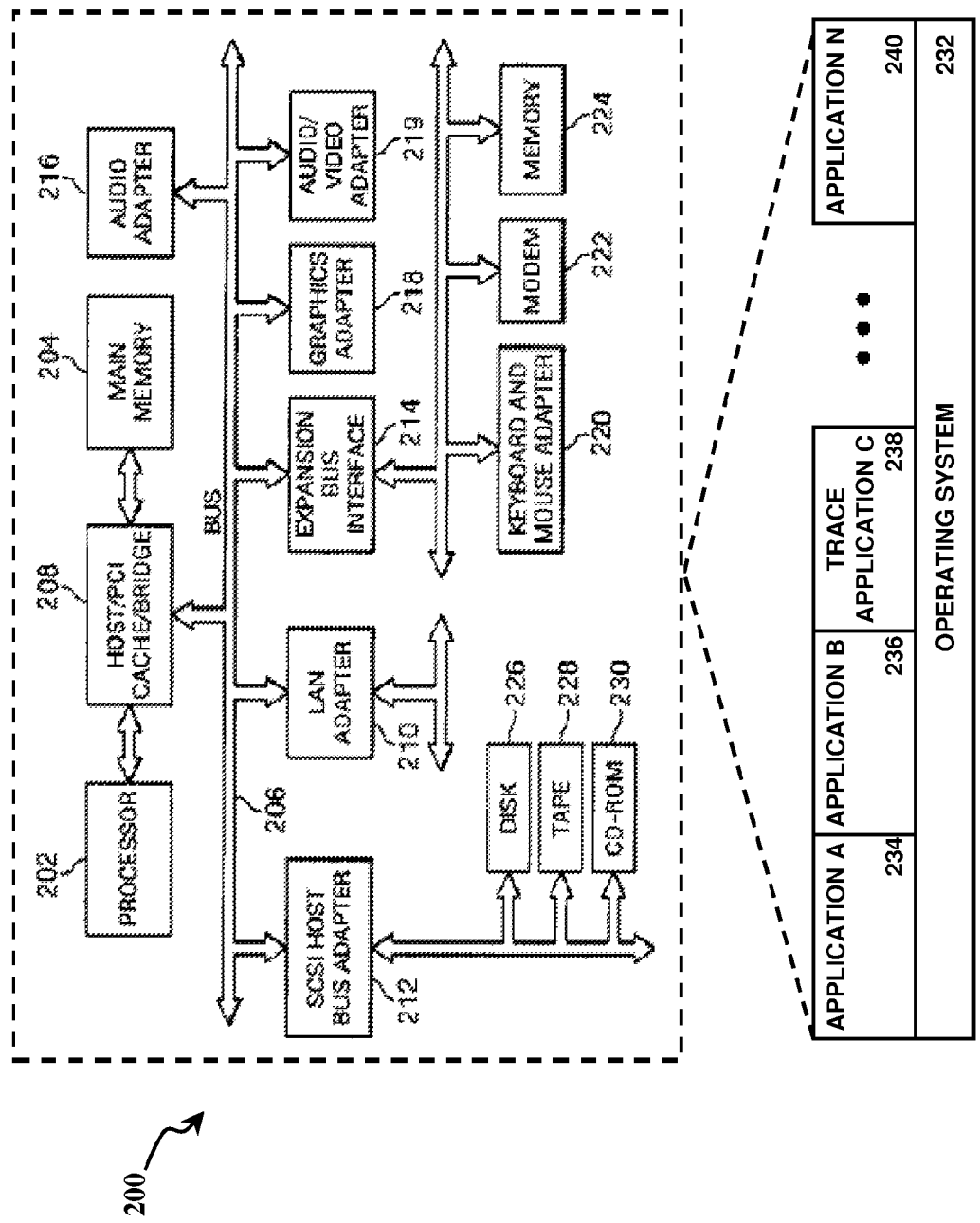
FIG. 2 depicts another block diagram of the processing system in which exemplary embodiments may be implemented.

With reference now to FIG. 2, a block diagram of a computer system 200 is shown in which exemplary embodiments may be implemented. Data processing system 200 is an example of a computer, such as server 104 or client 110 in FIG. 1, in which computer usable code or instructions implementing the processes may be located for the exemplary embodiments. System 200 employs a peripheral component interconnect (PCI) local bus architecture. Although the depicted example employs a PCI bus, other bus architectures such as accelerated graphics port (AGP) and industry standard architecture (ISA) may be used. Processor 202 and main memory 204 are connected to PCI local bus 206 through host 208. Host 208 also may include an integrated memory controller and cache memory for processor 202. Additional connections to PCI local bus 206 may be made through direct component interconnection or through add-in boards.

In the depicted example, local area network (LAN) adapter 210, small computer system interface SCSI host bus adapter 212, and expansion bus interface 214 are connected to PCI local bus 206 by direct component connection. Additionally, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Additional support for PCI expansion slots or add-in connectors is also supported.

An operating system 232 runs on processor 202 and is used to coordinate and provide control of various components within system 200 in FIG. 2. In an embodiment, the operating system 232 is a commercially available enterprise operating system such as z/Os, which is available from International Business Machines Corporation. A plurality of object oriented programming applications, such as C or C++, may run in conjunction with the operating system 232 and provides calls to the operating system 232 from these applications executing on client 200. In one non-limiting example, system 200 includes application 234, 236, 240 as well as trace application 238 whose analysis and management through a special purpose register is being monitored. Additionally, the applications 234-240 comprising functions, routines, etc. may be stored on storage devices, such as hard disk drive 226, and may be loaded into main memory 204 for execution by processor 202. Instructions for the operating system, the object-oriented programming system, and applications or programs are located on storage devices, such as disk drive 226 and may be loaded into main memory 204 for execution by processor 202. The processes of the exemplary embodiments may be performed by processor 202 using computer implemented instructions, which may be located in a memory such as, for example, main memory 204, read only memory 224, or in one or more peripheral devices.

Other internal hardware or peripheral devices, such as flash read-only memory (ROM), equivalent nonvolatile memory, or optical disk drives and the like, may be used in addition to or in place of the hardware depicted in FIG. 2. Also, in embodiments, the processes may be applied to a multiprocessor data processing system. For example, system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, system 200 may be a stand-alone system configured to be bootable without relying on some type of network communication interface, whether or not client 200 comprises some type of network communication interface. As a further example, system 200 may be a personal digital assistant (PDA), which is configured with ROM and/or flash ROM to provide non-volatile memory for storing operating system files and/or user-generated data. The depicted example in FIG. 2 and above-described examples are not meant to imply architectural limitations. The processes, in embodiments, are performed by processor 202 using computer implemented instructions, which may be located in a memory such as, for example, main memory 204, memory 224, or in one or more peripheral devices 226-230.

Figure 3:
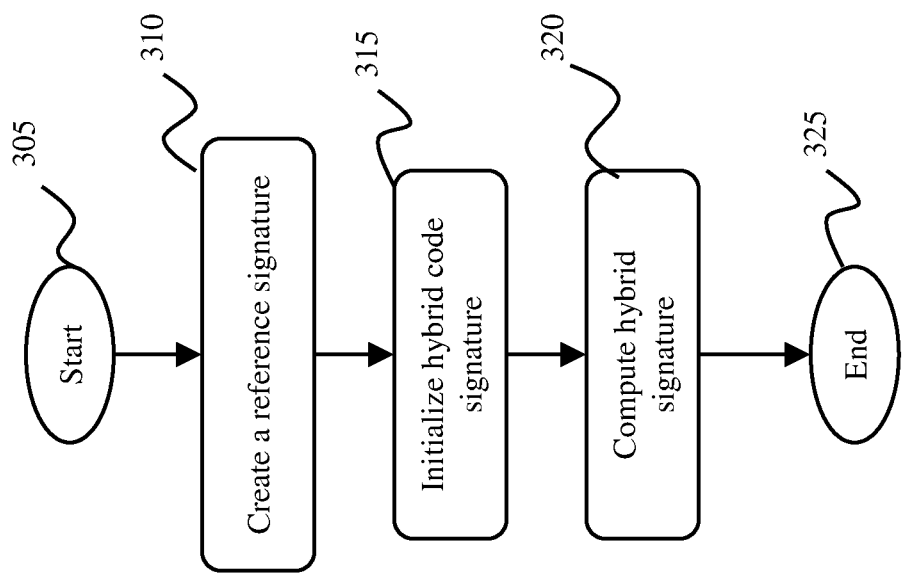
FIG. 3 depicts an exemplary process flow for computing a hybrid calling context signature in accordance with an embodiment.
Figure 4:
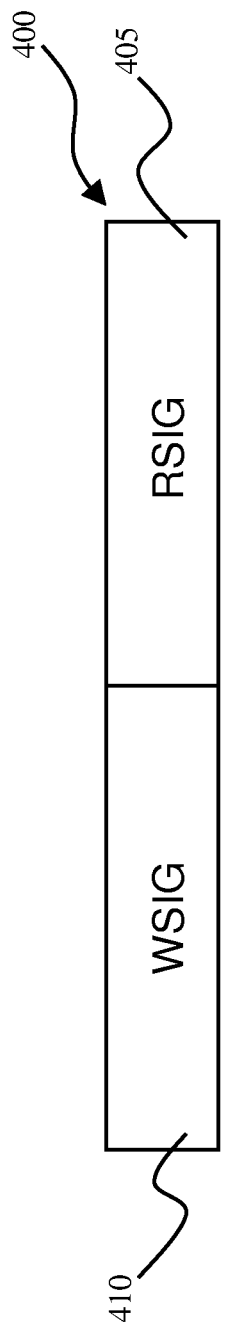
FIG. 4 depicts an exemplary interface for a data register according to exemplary embodiments.

FIG. 3 depicts a method for generating a hybrid code signature using a hybrid scheme according to exemplary embodiments. In one embodiment, the hardware signature may be implemented in main memory 204 or memory 224, as shown in FIG. 2. The method begins at block 305. At block 310, a reference signature (RSIG) is computed by utilizing the addresses of predetermined instructions, for example the root instruction, in the program's execution path. The computed RSIG is saved in a special purpose register called a calling signature register 400 (CSIG 400 as shown in FIG. 4). In an exemplary embodiment, the CSIG is a 64-bit register including a 32-bit reference signature 405 (RSIG 405 shown in FIG. 4) and a 32-bit calling context signature 410 (WSIG 410 shown in FIG. 4). The CSIG 400 is a register that is continuously updated by hardware whenever call and return instructions are executed. The RSIG 405 has a value of a combination of particular instruction addresses of interest such as, in one example, the address for frequently executed instructions (root instruction) that precedes a sequence of instructions that are always executed after the root instruction. In embodiments, the value of the root instruction signature to store as the signature RSIG 405 is determined for each of the program paths leading up to the root before initializing the trace detection hardware. In alternate embodiments, the signature is obtained from hardware registers using a sampling mechanism. An exemplary structure for the CSIG 400 is shown in FIG. 4.

Referring again to FIG. 3, at block 315, the initial value of the working signature WSIG 410 is initialized to the RSIG 405. Also, a hybrid code signature is computed and stored in WSIG 410 by utilizing the CALL level and a hashing value of the Return Address at block 320. Function calls and their returns are identified by call and return instructions. The CSIG 400 will update WSIG 410 for every call and return instruction. For every call, a wraparound counter is incremented by one to track the call level and a hashing function is implemented utilizing the call level of the bits in the counter and XOR'd with the return address for the called function to generate a hybrid code signature. In one exemplary embodiment, the hashing function includes a ROTATE_LEFT function. For every RETURN, the wraparound counter is decremented by one and a hashing value, computed with the hashing function, is calculated utilizing a ROTATE_RIGHT function. In one embodiment, the hashing function includes a ROTATE_RIGHT function. The result of applying the call and return functions will produce the original signature prior to the call. The contents of CSIG 400 is used with the return address for trace detection so that when the calling context signature computed in WSIG 410 matches the instruction address signature in RSIG 405, as well as, in other embodiments, meeting additional auxiliary conditions depending on the target application, the process ends at block 325.

As indicated above, FIG. 4 depicts an exemplary structure for the CSIG 400 register. As shown, CSIG 400 stores a hashed value of the working signature 410 representative of the calling context signature in bits 0:31 and stores the reference signature 405 in bits 32:64. In other embodiments, RSIG 405 and WSIG 410 may be of 64-bit precision as well. The CSIG 400 is a register that is continuously updated by hardware whenever call and return instructions are executed. The hashing function for updating the CSIG 400 register is chosen such that its value at any instruction represents the sequence of calls and returns that were executed leading up to that instruction. The trace detection hardware is then enhanced so that it recognizes the beginning of a trace not simply as when the root instruction is executed, but only when the root instruction is executed at a time when RSIG 405 is equal to a pre-determined value. In other exemplary embodiments, software determines the value of RSIG 405 at the root instruction for each of the program paths leading up to the root instruction before initializing the trace detection hardware. One exemplary method of determining the value RSIG 405 when the root instruction is executed is for software to compute it. It can do so by starting with the value of RSIG 405 when the program is initialized, and then computing WSIG 410 updates manually while following the program path as calls and returns are encountered. Another exemplary embodiment for determining RSIG 405 includes causing a synchronous interrupt at a given instruction such as the root, initializing the RSIG 405 to a known value at that instruction. Yet another exemplary of discovering the value of the RSIG 405 at the root instruction would be to extend hardware that recognizes the addresses of frequently executed instructions. This hardware includes multiple registers that contain the addresses of the most-frequently executed instructions. These registers could be extended to contain the call signatures of these frequently executed instructions as well as just their addresses.

Figure 5:
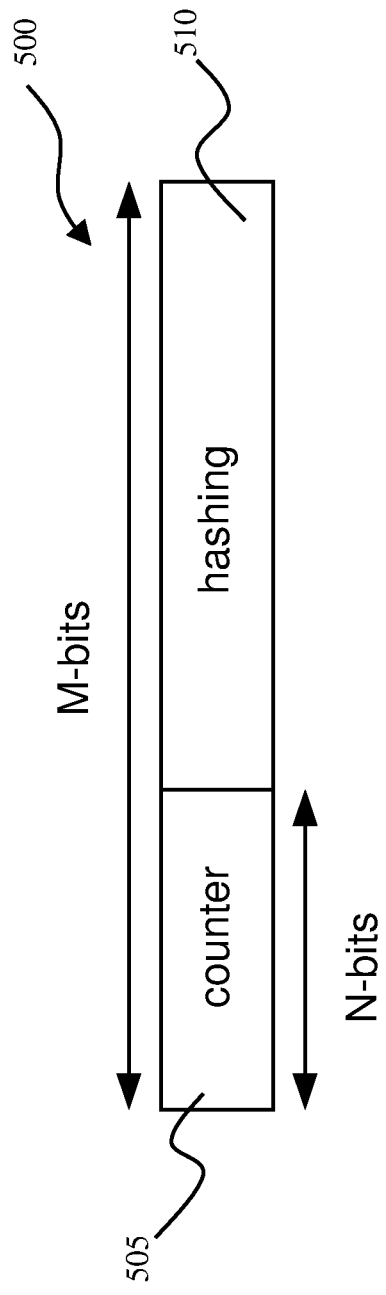
FIG. 5 depicts an example structure of a data structure for a hybrid calling context signature in accordance with an embodiment.

An exemplary hashing function for computing the hybrid code signature together with its structure is shown in FIG. 5 according to exemplary embodiments. As shown, the hybrid calling context signature 500 is computed with a reversible function utilizing a counter to track the call levels. The hybrid calling context signature 500 is an M-bit signature including a fixed number of N-bits stored in a counter 505 for tracking each call and return. Particularly, for each call, the counter is incremented and for each return, the counter is decremented. The counter is a wrap-around counter, so that once the counter reaches a maximum value, incrementing the counter will overflow it to zero, and decrementing from zero will install the maximum number of bits. In one embodiment, M is 32 and N is 6. It is to be appreciated that the hybrid signature of M-bits is computed with the computed hashing signature 510 (FIG. 3) and the value of the N-bit counter.

An exemplary hybrid signature includes a hashing function shown below where the hashing function for a call instruction is utilized with a ROTATE_LEFT and a hashing function for a return instruction is utilized with a ROTATE_RIGHT.

Hashing=ROTATE_LEFT(Hashing,S)XOR(RETURN_ADDRESS>>2);

Hashing=ROTATE_RIGHT(Hashing XOR(RETURN_ADDRESS>>2),S).

The hashing function ROTATE_LEFT is employed along with the XOR operator to compute the hybrid signature utilizing the value of the hybrid signature (or Hashing signature). ROTATE_LEFT(Hashing, S) is defined as the bit wise left rotation of the initialized WSIG 410 by S bits. In some exemplary embodiment, S=3, 5, 7, or 9. In the ROTATE_LEFT function, the initial reference signature RSIG 405 (FIG. 4) or the hybrid signature computed and stored in CSIG 400 for a call level greater than 1 is rotated left by S bits. The ROTATE_LEFT function is defined as the bit wise left shifting of the hashing signature by S bits and inserting the higher-order S bits as the lower-order S bits. Once the ROTATE_LEFT function is performed on the hashing signature, the hashing signature is updated with the XOR of the RETURN_ADDRESS expected for the function call that is shifted right by 2 bits. The RETURN_ADDRESS is typically the next instruction following the CALL operation.

Similarly, for a return instruction, the hashing signature is computed by XOR'ing the hashing signature with the RETURN_ADDRESS expected for the function call shifted right by 2 bits. The ROTATE_RIGHT function is implemented next by bit wise right shifting of the hashing signature by S bits and inserting the lower-order S bits as the higher-order S bits. These ROTATE_LEFT and ROTATE_RIGHT functions will produce the signature WSIG 410 (FIG. 4) after calls and returns are executed, i.e. a signature associated with an instruction is always the signature before the instruction is executed. Trace detection is stopped once the hybrid signature WSIG 410 (FIG. 4) matches the reference signature RSIG 405 (FIG. 4), and additional auxiliary conditions are met, depending on the target application. In one embodiment, the additional auxiliary condition is where the instruction address matches a predetermined address stored in another register. Another embodiment of an additional auxiliary condition is where the loop counter register, which tracks the number of iterations in a loop, matches a predetermined value stored in another register. In yet another embodiment, the additional auxiliary condition is where a hash value of the working signature WSIG 410 XOR'ed with the instruction address, loop counter, or another auxiliary register matches the reference RSIG 405. In embodiments, auxiliary conditions described above may be combined such as, for example, when a particular instruction in a loop is matched, and its corresponding loop counter matches a desired value. It is to be appreciated that the auxiliary conditions are applicable to improving precision during trace detection as well as other applications, such as performance analysis, debugging, dynamic program optimization, and security, among others.

Technical effects and benefits include the ability to generate a hybrid code signature for each call and return, and incrementally compare it to a reference signature in order to implement trace detection.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Further, as will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for generating a hybrid code signature, the method comprising:
   executing, via a processor, an application, the executing comprising executing a root instruction of the application;
   profiling, via the processor, the executing of the application, the profiling comprising storing a reference signature determined from the root instruction;
   determining, via the processor, a working signature of instructions executed subsequent to the executing of the root instruction, the determining comprising utilizing a CALL level and a hashing value of a return address in response to storing the reference signature;
   tracking the updating of the working signature by storing a value in a counter indicative of the CALL level; and
   updating continuously, via the processor, the working signature with a hashing function while the working signature at least does not match the reference signature;
   wherein the hashing function includes a bitwise rotation of the working signature by a predetermined number of bits.

2. The method of claim 1, wherein the updating of the working signature further comprises determining additional auxiliary conditions for the executing application.

3. The method of claim 2, wherein the determining of the additional auxiliary conditions further comprises determining whether an address of the root instruction matches a predetermined address, whether a first value stored in a loop counter matches a second predetermined value, or whether the reference signature matches a hash value of at least one of Exclusive-OR'ing the address with the working signature or Exclusive-OR'ing the first value with the working signature.

4. The method of claim 1, wherein the updating of the working signature further comprising the executing of the application after the root instruction.

5. The method of claim 1, further comprising updating the working signature in response to executing a call instruction and a return instruction during the execution of the application.

6. The method of claim 1, further comprising updating the working signature in response to executing a branch instruction and resuming after the branch instruction during the execution of the application.

7. The method of claim 3, further comprising incrementing the value of the counter during the executing of the call instruction and decrementing the value of the counter during the executing of the return instruction.

8. The method of claim 1, further comprising initially storing the reference signature as the working signature in response to the executing of the root instruction.

9. The method of claim 1, wherein the working signature further comprises generating a hash value of the working signature by Exclusive-OR'ing the reference signature with the working signature.

10. A system comprising a processor configured to perform a method, the method comprising:
    executing an application, the executing comprising executing a root instruction of the application;
    profiling the executing of the application, the profiling comprising storing a reference signature;
    determining a working signature of instructions executed subsequent to the executing of the root instruction, the determining comprising utilizing a CALL level and a hashing value of a return address in response to storing the reference signature;
    tracking the updating of the working signature by storing a value in a counter indicative of the CALL level; and
    updating continuously the working signature with a hashing function while the working signature at least does not match the reference signature;
    wherein the hashing function includes a bitwise rotation of the working signature by a predetermined number of bits.

11. The system of claim 10, wherein the updating of the working signature further comprises determining additional auxiliary conditions for the executing application.

12. The system of claim 11, wherein the determining of the additional auxiliary conditions further comprises determining whether an address of the root instruction matches a predetermined address, whether a first value stored in a loop counter matches a second predetermined value, or whether the reference signature matches a hash value of at least one of Exclusive-OR'ing the address with the working signature or Exclusive-OR'ing the first value with the working signature.

13. The system of claim 10, wherein the updating of the working signature further comprises executing a call instruction and a return instruction during the execution of the application.

14. The system of claim 10, wherein the updating of the working signature further comprising executing a branch instruction and resuming after the branch instruction during the execution of the application.

15. The system of claim 10, wherein the method further comprises incrementing the value of the counter during the executing of the call instruction and decrementing the value of the counter during the executing of the return instruction.

16. The system of claim 10, wherein the method further comprises initially storing the reference signature as the working signature in response to the executing of the root instruction.

17. The system of claim 10, wherein the working signature comprises a hash value of Exclusive-OR'ing the reference signature with the working signature.

18. A computer program product comprising:
   a tangible storage medium readable by a processing circuit and storing instructions for execution by the processing circuit for performing a method comprising:
   executing an application, the executing comprising executing a root instruction of the application;
   profiling the executing of the application, the profiling comprising storing a reference signature;
   determining a working signature of instructions executed subsequent to the executing of the root instruction, the determining comprising utilizing a call level and a hashing value of a return address in response to storing the reference signature;
   tracking the updating of the working signature by storing a value in a counter indicative of the call level; and
   updating continuously the working signature with a hashing function while the working signature at least does not match the reference signature;
   wherein the hashing function includes a bit wise rotation of the working signature by a predetermined number of bits.

19. The computer program product of claim 18, wherein the method further comprises updating of the working signature including determining additional auxiliary conditions for the executing application.

20. The computer program product of claim 19, wherein the determining of the additional auxiliary conditions further comprises determining whether an address of the root instruction matches a predetermined address, whether a first value stored in a loop counter matches a second predetermined value, or whether the reference signature matches a hash value of at least one of Exclusive-OR'ing the address with the working signature or Exclusive-OR'ing the first value with the working signature.

21. The computer program product of claim 18, wherein the updating of the working signature further comprises executing a call instruction and a return instruction during the execution of the application.

22. The computer program product of claim 18, wherein the updating of the working signature further comprising executing a branch instruction and resuming after the branch instruction during the execution of the application.

23. The computer program product of claim 18, wherein the method further comprises incrementing the value of the counter during the executing of the call instruction and decrementing the value of the counter during the executing of the return instruction.

24. The computer program product of claim 18, wherein the method further comprises initially storing the reference signature as the working signature in response to the executing of the root instruction.

25. The computer program product of claim 18, wherein the method further comprises generating a hash value of the working signature by Exclusive-OR'ing the reference signature with the working signature.

* * * * *